Sept. 7, 1965  H. LANGSTROTH  3,204,875
SPRAY HEAD HAVING A VALVE STEM AND DISC-FORM CHECK VALVE
Filed July 23, 1963  3 Sheets-Sheet 1
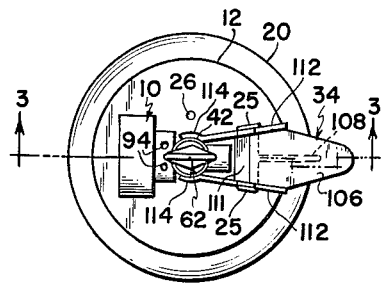
Fig. 1
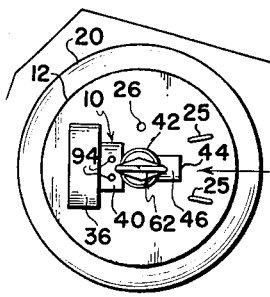
Fig. 2
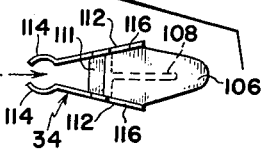
Fig. 8
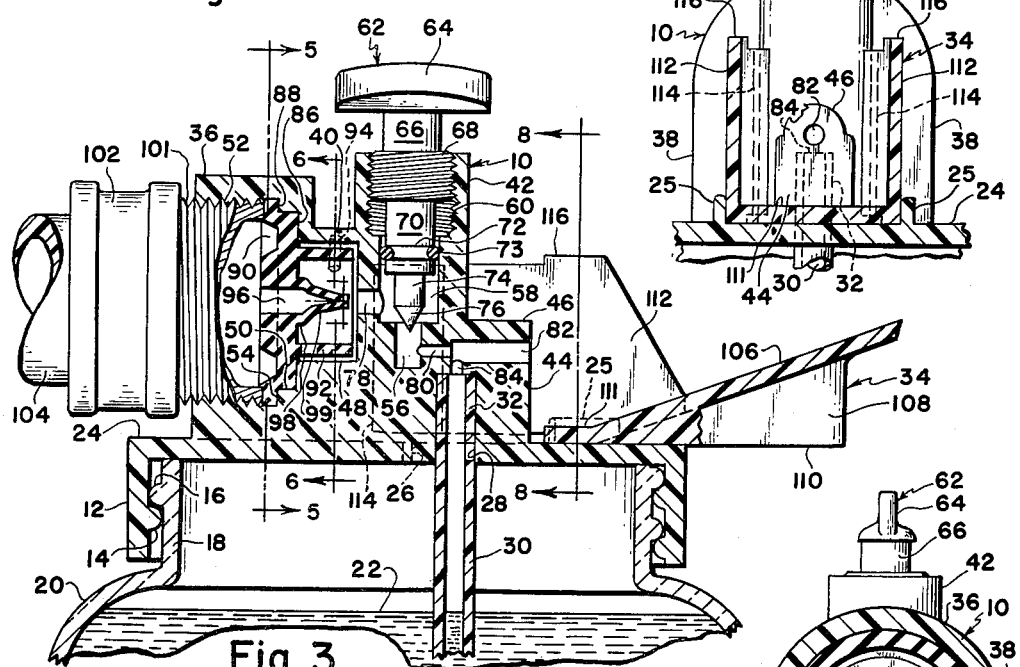
Fig. 3
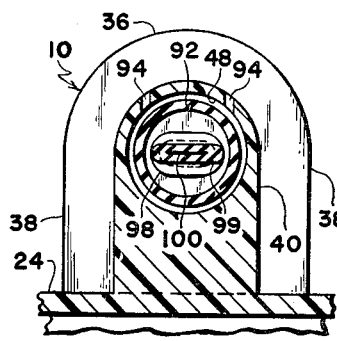
Fig. 6
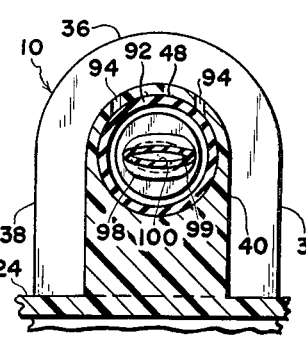
Fig. 7
Fig. 5
INVENTOR
HALL LANGSTROTH
BY John Cyril Malloy
ATTORNEY

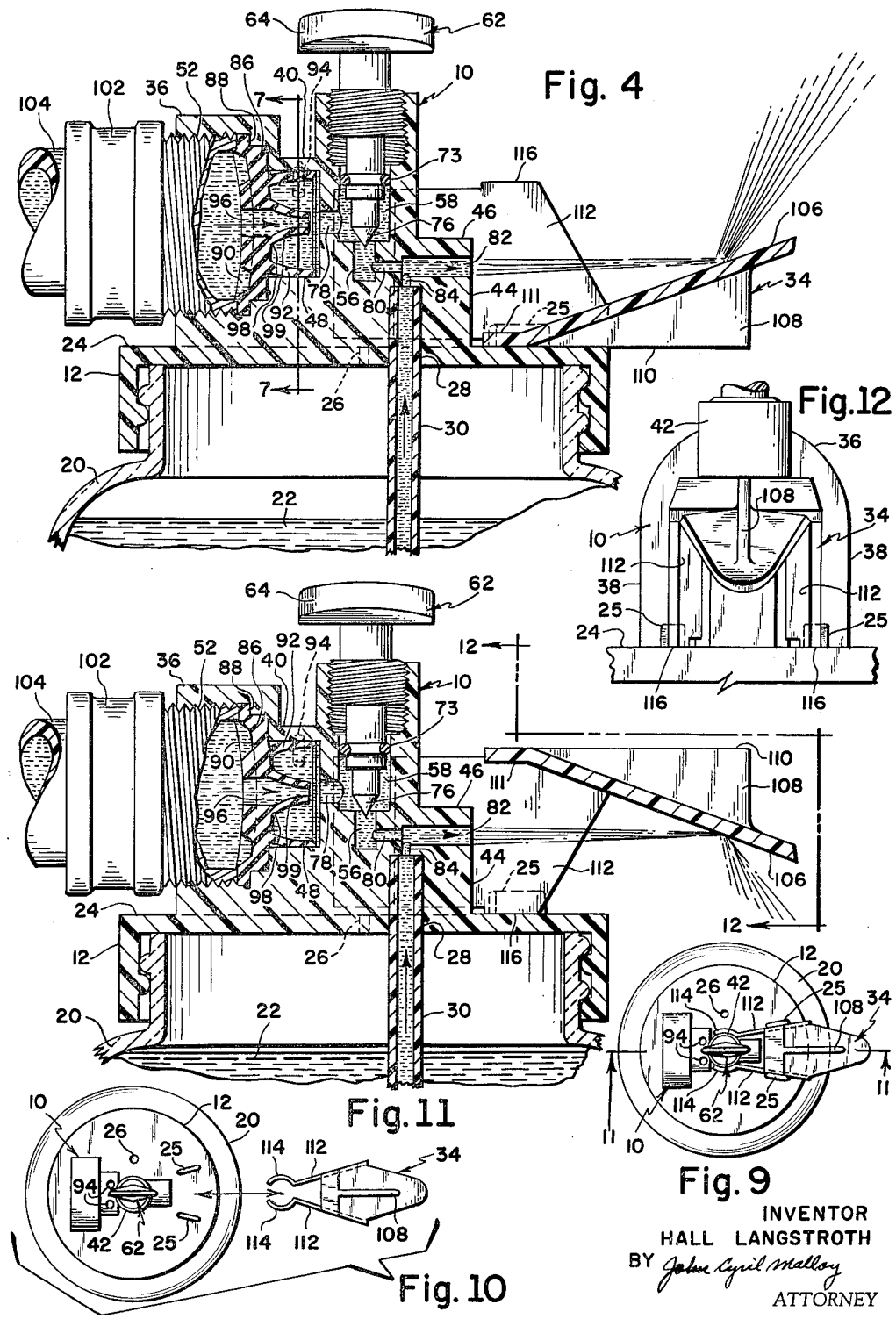

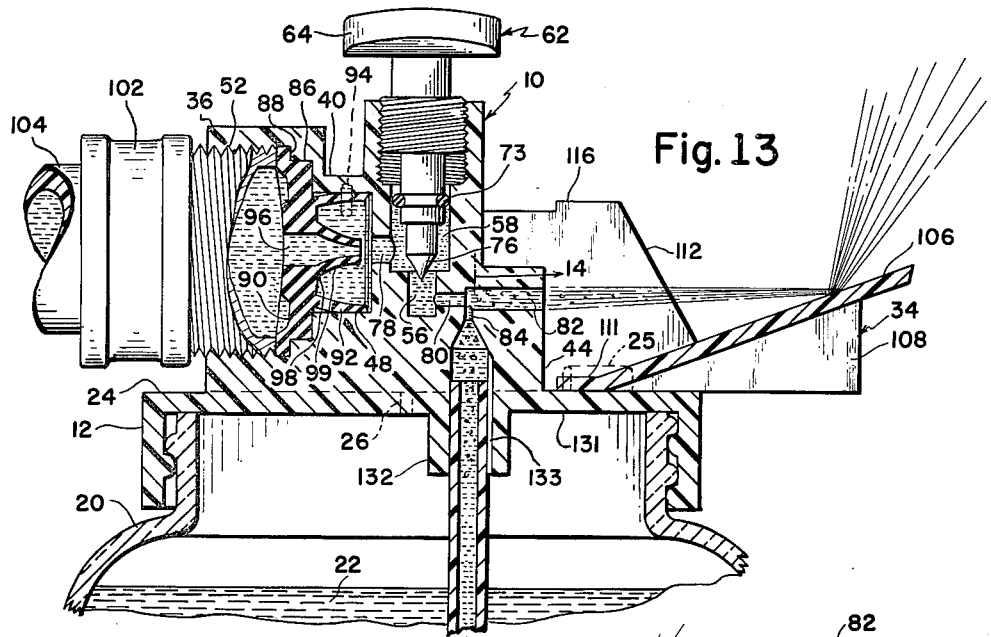
Fig. 13
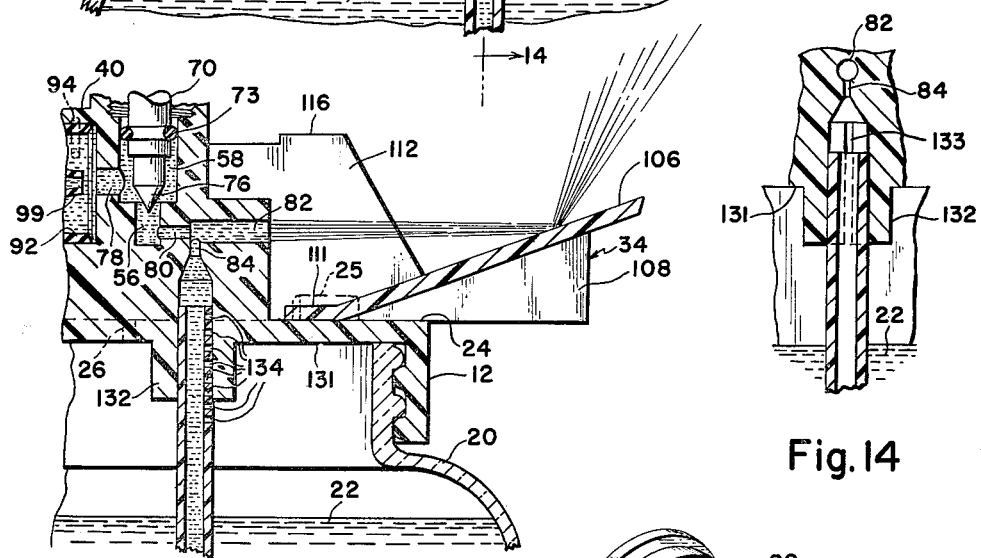
Fig. 15
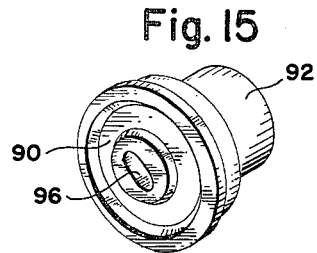
Fig. 16
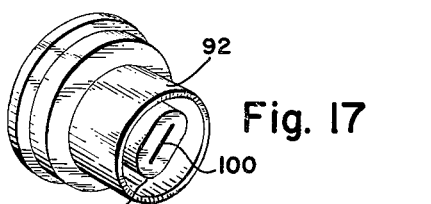
Fig. 14
Fig. 17
INVENTOR.
HALL LANGSTROTH
BY John Cyril Malloy
ATTORNEY United States Patent Office 3,204,875
Patented Sept. 7, 1965

3,204,875
SPRAY HEAD HAVING A VALVE STEM AND DISC-FORM CHECK VALVE
Hall Langstroth, Coral Gables, Fla., assignor to Allpro Products, Inc., Coral Gables, Fla., a corporation of Florida
Filed July 23, 1963, Ser. No. 297,091
8 Claims. (Cl. 239—318)

This invention relates to fluid applicators, in general, and more particularly to a spray unit, operable in association with a pressurized water line, and in still greater particular to a check valve and associated elements forming a part of such a unit, and cooperating with other elements therein.

In the spraying of insecticides, current practice favors the mixing of the chemicals by metering continuously into a moving stream of water from a pressurized supply source. In the case of small operators, such as householders, the spray unit is relatively small, and easily portable, by hand, and a common garden hose forms the source of water supply. Since the insecticides are toxic, and usually harmful, in some degree, to humans, the problem of back-siphoning into the supply line becomes a matter of some importance, and it is a general object of the invention to obviate this difficulty. A further object is to attain the aforesaid end in a novel manner, and in an organization which affords a plurality of other advantages.

More particularly it is an object to provide a sprayer unit having a check valve of unitary construction, of plastic material, which combines a plurality of functions. In still greater particular, it is an object to provide a check valve which, in addition to its primary function as a check valve, also functions as a sealing washer or gasket, and as a control for a vent system which bears a special relation to the problem of preventing reverse action in an aspirating mixer unit.

Yet another object is to provide a spray head having an internal structure co-operatively related to a check valve unit as aforesaid, and particularly to one also having a novel, reversible deflection plate at the outlet.

The objects also include provision of a spray head and a unitary check valve, each of which is simple in structure, low in cost, easy of manufacture, assembly and maintenance, and durable and reliable in use.

These and other objects, which will be apparent, are attained by the present invention, a preferred form of which is described in the following specification, as illustrated in the drawing, in which:

FIG. 1 is a top plan view of a spray head constructed according to the concepts of the present invention;

FIG. 2 is a bracketed view, showing the deflector plate apart from the spray head, after removal therefrom;

FIG. 3 is an axial, sectional view, taken on the plane of the line 3—3 of FIG. 1, and enlarged is scale over that of FIG. 1;

FIG. 4 is a view similar to FIG. 3, showing the check valve in the open position it assumes in response to pressure from the upstream side, or inlet into the spray head;

FIG. 5 is a transverse sectional view through the spray heat inlet and check valve, taken on the plane of the line 5—5 of FIG. 3;

FIG. 6 is a transverse, sectional view, taken on a plane parallel to that of FIG. 5, as indicated by the line 6—6 of FIG. 3;

FIG. 7 is a view similar to FIG. 6, but taken on the plane of the line 7—7 of FIG. 4, to show the check valve in open, or spread condition;

FIG. 8 is another transverse, sectional view through the spray head, particularly the deflector unit, taken on the plane of the line 8—8 of FIG. 3;

FIG. 9 is a view similar to FIG. 1, showing the deflector unit in a reversed position of mounting;

FIG. 10 is a view similar to FIG. 2, but based on FIG. 9;

FIG. 11 is a view similar to FIG. 4, but based on FIG. 9;

FIG. 12 is a side elevational view of the spray head of FIG. 11, taken on the line 12—12 of FIG. 11;

FIG. 13 is a view similar to FIG. 3 illustrating an alternative means of fastening a metering tube to the spray head;

FIG. 14 is a partial view taken along the line 14—14 of FIG. 13 and looking in the direction of the arrows;

FIG. 15 is a partial view similar to FIG. 13 and illustrating an alternative type of metering tube to that shown in FIG. 13;

FIG. 16 is a perspective view of the check valve house; and

FIG. 17 is another perspective view of the check valve.

Referring to the drawings by characters of reference there is shown a spray head, indicated as a whole by the numeral 10, of unitary construction, and fabricated from suitable plastic, as by injection or pressure molding, or other suitable methods. As seen in FIGS. 2 and 3, the head has an inverted, cylindrical cup portion 12, with an internal thread 14, about one convolution in extent, which is engageable with an external thread 16, on the neck 18 of a glass jar 20, or other suitable container, either refillable, or a one-use, commercially available item, carrying the insecticide solution 22.

The flat top 24 of skirt or cup 12 has, near its center, a narrow bore 26, consitiuting a vent which maintains the space above the liquid 22 at atmospheric pressure, and also a somewhat larger bore 28 accommodating a plastic tube 30, which extends into a continuation 32 of bore 28 in the head 10, and communicates with the through passage thereof, and also extends through the liquid 22 to a point near the bottom thereof, for conveying the said fluid into the spray head. While the tube 30 could be an integral part of head 10, its exposed position would render it vulnerable to undue hazards of breakage, and for this reason the separate, and replaceable tube is preferred. The use of a replaceable tube also enables use of supply containers 20 of different depths.

As seen in FIG. 2, the main, working body, 10, of the spray head, is relatively small, in overall dimensions, in comparison to the cup 12. The detachable, deflector unit 34, shown apart from the head, will be described hereinafter. The exterior of the entrance chamber section 36 of the head (FIG. 3) has a semi-cylindrical, domed top, with flat, vertical sides 38 (FIG. 5), rising from top 24 of cup 12, and in following sequence to chamber section 36 is a section 40, which is generally similar shape. Inwardly of section 40, and merging slightly therewith, is a relatively slender, vertical boss 42, rising slightly above the top of section 36, and located in substantially co-axial relation to the cup 12; and beyond boss 42 is a final, upright, flat-sided section 44, having a reduced, semi-cylindrical, domed top, 46. As stated above, all four sections, 36 40, 42 and 44 are integral parts of the unitary, working head, 10.

The through passage in the working head is arranged as follows: The entrance sections 36 and 40 are provided with a series of stepped, co-axial bores, including a minimum bore 48 (FIG. 6), mainly within section 40, extending from a location slightly within boss 42, to a location slightly within outer section 36. Adjacent bore 48 is a counterbore 50, beyond which is an internally threaded, counterbore 52, defining with counterbore 50, a flat, annular shoulder 54, for a purpose later to be set forth.

Boss 42 also has a series of stepped, coaxial bores, including an innermost, minimum bore 56, a first counterbore 58, and a threaded, outer, counterbore 60. A cut-off valve 62, for closing the main passage through the head 10, has a wing-head 64, for thumb-and-finger operation, a first shank portion 66, followed by a threaded portion 68, engageable in threaded bore 60, a somewhat reduced shank 70, below the threads, and receivable in counterbore 58, shank 70 having an annular channel 72, seating and holding an O-ring 73, and a minimum, reduced shank portion 74, having a terminal, conical end 76, adapted to seat on the rim of bore 56. On the upstream side, communication is made with the interior of boss 42 by a lateral bore 78, leading from bore 48 to counterbore 58; and on the downstream side, a small lateral bore 80 leads from bore 56 to a counterbore 82, slightly longer than the final, downstream section 46, counterbore 82 being the discharge orifice. The relative sizes of bores 56, 80 and 82 are important, with bore 80 representing a bottle-neck between the two others, since this gives rise to pressure conditions which provide an aspirating effect. This is utilized through another small bore 84, communcating the interior of the metering tube 30 with the exit passage 82, whereby the insecticide fluid is drawn into the stream passing through the spray head.

As stated above, it is highly desirable to avoid backwash of insecticide into the supply line, and to this end, the novel valve unit is provided in the upstream sections 36, 40 of the head. Viewed generally, the valve, which is preferably of rubbery material of low modulus, comprises a disc-shaped base 86, receivable in threaded bore 52, and having an annular, shouldered portion 88, nesting with bore 50 and shoulder 54. In its outer face, the base 86 has an annular channel 90, with sloping sides. On its inner, or downstream, side, the valve carries a concentric tubular sleeve or cup, 92, which fits loosely in bore 48, in covering relation to a pair of apertures 94, in section 40, the arrangement being such that pressure from upstream will cause sleeve 92 to seal off the apertures, whereas a deficiency of pressure on the upstream side of the valve will result in air at atmospheric pressure overcoming sleeve 92 and passing through the vents, into chamber 40.

The one-way feature of the check valve, as aided by the by-passing vents, is provided in a central passage through the disc, which, in continuation, is defined on the downstream side of the disc by a pair of walls having a line of contact which is normally closed, but opens under pressure from the upstream side of the system. Thus, as seen in FIG. 5, bottom disc 86 has a central, elongate, generally elliptical, but flat-sided, through opening 96, and on the downstream side of the disc, extending, tubular wall portion 98, of thickness comparable to sleeve 92, for ready flexibility, forms a continuation of opening 96. Beyond wall portion 98, the walls on the long sides of the ellipse converge, as at 99 in a gradual flattening of the ellipse in the downstream direction until they meet in close contact, this being their normal arrangement under conditions of no stress in the rubber. In this tapering, the major axis of the ellipse is not diminished materially, so that the slit 100 is as long as the major dimension of elliptical passage 96. As one result of this arrangement, optimum cross section for fluid passage is maintained.

The spray head is placed in service by engaging, in threaded bore 52, the threaded neck 101 of a nipple or collar 102, carried on a garden hose or other fluid line 104. With the valve disc fitted in the spray head as shown, and as described above, the inner edge of threaded neck 101 engages the outer, peripheral margin of the disc, and urges it against shoulder 54, whereby one of the functions of the valve, that of serving as a fluid-sealing washer is realized, as an incident to the main purpose of sealing the valve in position. Thus, two functions are served, and, as will be seen, at least two other functions flow from the structure of the unitary valve.

Assuming that the spray head is secured on a container 20, having a sufficient supply of chemical solution or mixture 22, the valve 62 is turned, to back the needle 76 from its seat, opening the passage for movement of fluid through the spray head. Upon pressurization of the fluid in the conduit 104, on the upstream side of the check valve, the fluid tends to pass through the elliptical opening 96 of the valve, and in response to this pressure in the upstream side, the converged walls 99 readily respond, by moving apart, until the resultant discharge opening attains an optimum size and shape in relation to the pressure differential. In this action, the chamber 48 quickly fills, due to the restrictive effect of port 78, and the resultant pressure in chamber 48 causes the sleeve 92 to press against ports 94, sealing off the chamber from the exterior of the spray head, and thus preventing leakage of fluid under pressure. As a consequence, the pressurized fluid is constrained to movement through the spray head, passing in turn through port 78, counterbore 58, bore 56, throat 80, and finally, exit port 82. In passing into the latter from throat 80, the stream of fluid suffers a lowering of pressure, to which the atmospheric pressure in container 20 responds by forcing a corresponding amount of fluid from the container, up through tube 30 and into admixture with the main stream in exit port 82.

In all of the actions under pressure from upstream, flexure of the rubber valve is assisted by channel 90, without narrowing of opening 96.

In the event of any lowering of pressure on the upstream side of the check valve, such as would be sufficient to bring fluid and/or air back through the passage of the spray head, picking up contaminating fluid due to the fluid residue, and also the continuing aspirating effect, the passage of such material is blocked, for three reasons, namely, the inherent tendency of the valve slit to close on diminution of pressure on the upstream side, the cumulative effect of the higher pressure on the downstream side, which tends further to press together the walls defining the slit, and the response of the sleeve 92, which opens to atmospheric pressure, and provides a direct path for the latter to the valve slit, which operates in preference to retrograde fluid motion through the spray head passages. Thus are accomplished the manifold functions of the simple, unitary valve, alluded to in the objects of the invention set forth hereinabove, and otherwise mentioned in the description.

For better utilization of the stream delivered from the spray head, the novel, compact structure of the latter is peculiarly adapted to use of a stream deflector, which will now be described, and which is indicated as a whole by the numeral 34. With reference to FIGS. 2, 3 and 8, the detachable unit 34 comprises a baffle plate proper, 106, having a perpendicularly disposed, triangular web 108, centrally located on its under side, which not only strengthens the plate against bending, but also provides a ground support along its base, 110, whereby the plate 106 is supported, in use, at a suitable, predetermined angle. A short, inner portion 111, of plate 106 is parallel to the base 110 of the web. The plate 106 is preferably tongue-shaped and tapering in width in its outer portion, and also has inwardly converging sides on its inner end, from which rise the pair of side walls 112, converging similarly to said sides, and having vertical, cylindrical segments 114 on their inner ends, with axis arranged perpendicularly to web base 110, whereby to be arranged vertically when base 110 dwells on cap top 24, and also being arranged to yield, resiliently, for mounting on boss 42 in a snap action. As seen in FIG. 3, the parts are so arranged that a jet from exit port 82 will impinge on plate 106, and not only be deflected upwardly, but also spread out fanwise. This form of use will be most suitable in the spraying of the under portions of leaves, twigs, branches, or foliage in general, especially in regions near ground level. For uses where a downwardly directed spray is desired, the deflector unit may be slipped off, turned upside down, and replaced on the boss 42, in which case the top edges 116 of side walls 112 dwell on cap top 24, to give stability and direction to the plate 106 in its downwardly deflecting position shown in FIG. 11. In either position of use, the side walls 112 limit side scattering of the spray pattern.

Lugs 25 projecting upwardly from the top 24 of the cup 12 align the deflector 34 with respect to the exit port 82 and maintain it in position so that it cannot rotate about the center line of the boss 42 so as to defeat the purpose of the side walls 112 and plate 116.

Referring to FIG. 13, underside 131 of the flat top 24 may be provided with a downwardly projecting cylindrically shaped portion 132 having a continuation of the bore 28 therethrough for a purpose to be described. As seen in FIG. 14, one side of the wall of the bore may be provided with a groove 133 in the side wall adjacent an end thereof, or, alternatively, as seen in FIG. 15, a series of small holes 134 may be provided in the tube. In operation, depending upon the number of holes 134 which are exposed, or the positioning of the tube in the bore 28, there will be a volume of air sucked into the tube in lieu of insecticide thereby providing means to adjust the concentration of the insecticide in the spray by merely sliding the tube inwardly or outwardly relative to the projection 132.

If the cross-sectional area of the bore or passageway 82 is 3 to 5 times larger than the cross-sectional area of the bore or passageway 80, it has been found that the siphon action is reduced eliminating the desirability for an air bleed. However, if the ratio is greater than 5 to 1, then the siphon action fails to be sufficient, and, if the ratio is less than 3 to 1, then it is desirable to have an air bleed provision in order to control the concentration of the sprayed insecticide.

While the instant invention has been shown and described herein in what is conceived to be the most practical and preferred embodiment, it is recognized that departures may be made therefrom within the scope of the invention, which is, therefore, not to be limited to the details disclosed herein but is to be accorded the full scope of the claims so as to embrace any and all equivalent apparatus and articles.

What is claimed is:

1. A spray head comprising a unitary, main body having a cylindrical cup element with internal threads adapted for connection with a fluid container, and means carried on said cap, generally diametrally of said element, and defining a system of through passages for fluid under pressure, said means having a threaded, entrance bore, on the upstream side, a first reduced bore beyond said entrance bore, defining a first shoulder, a second reduced bore beyond said first reduced bore, defining a second shoulder, said second, reduced bore having at least one lateral port communicating with the atmosphere, an exit bore on the downstream side, and an intermediate passage arranged transversely to said exit bore and the other said bores, said passage comprising an inner bore, an intermediate counterbore, and a threaded, outer counterbore, a valve stem threadedly received in said outer counterbore, and having a tapered, inner end seatable on the rim of said inner bore, a port communicating between said second, reduced bore and said intermediate counterbore, a port communicating between said inner bore and said exit bore, and substantially less in diameter than said exit bore, said cap having an aperture venting to atmosphere, said cap and said means having a common passage, adapted to hold a tube for immersion in a said fluid container, and said means having a restricted passage communicating between said common passage and said exit bore, and a check valve of rubbery material, comprising a disc-form base seated on said second shoulder, and having an extending, peripheral flange seated on said first shoulder, said disc having an annular channel on its upstream side, and a skirt forming a cylindrical cup on its downstream side, loosely fitted in said second, reduced bore and adapted to close said lateral port under internal pressure, and yield to external pressure to uncover said lateral port, said disc having a central, through opening, of elongate, elliptical form, and said disc having a second skirt on its downstream side, forming a continuation of said opening, and having a terminal portion with side walls converging to a line of contact, forming a slit generally comparable in length with the major axis of said opening.

2. A device as in claim 1, the portion of said means containing said intermediate passage comprising a generally cylindrical boss, and a baffle element having a baffle plate with a pair of transversely extending walls with parallel, opposite edges angularly disposed to the plane of said plate, and said walls having inner, terminal ends in the form of cylindrical segments, with opposed cavities, and adapted for resilient, clamping engagement with said boss.

3. A device as in claim 2, said plate having a triangular web extending transversely from one side, and having an edge parallel to said edges of said pair of walls.

4. A spray head comprising a unitary main body having a cylindrical cup element adapted for attachment to a fluid container, and means carried on said cap, and defining a system of through passages for fluid under pressure, said means having an entrance bore, on the upstream side, a first reduced bore beyond said entrance bore, defining a first shoulder, a second reduced bore beyond said first reduced bore, defining a second shoulder, said second, reduced bore having at least one lateral port communicating with the atmosphere, an exit bore on the downstream side, and an intermediate passage arranged transversely to said exit bore and the other said bores, said passage comprising an inner bore, an intermediate counterbore, and a threaded, outer counterbore, a valve stem threadedly received in said outer counterbore, and having a tapered, inner end seatable on the rim of said inner bore, a port communicating between said second, reduced bore and said intermediate counterbore, a port communicating between said inner bore and said exit bore, and substantially less in diameter than said exit bore, said cap having an aperture venting to atmosphere, said cap and said means having a common passage, adapted to hold a tube for immersion in a said fluid container, and said means having a restricted passage communicating between said common passage and said exit bore, and a check valve of rubbery material, comprising a disc-form base seated on said second shoulder, and having an extending, peripheral flange seated on said first shoulder, said disc having an annular channel on its upstream side, and a skirt forming a cylindrical cup on its downstream side, loosely fitted in said second, reduced bore and adapted to close said lateral port under internal pressure, and yield to external pressure to uncover said lateral port, said disc having a central, through opening, of elongate, elliptical form, and said disc having a second skirt on its downstream side, forming a continuation of said opening, and having a terminal portion with side walls converging to a line of contact, forming a slit generally comparable in length with the major axis of said opening.

5. A spray head comprising a unitary main body having a cylindrical cup element adapted for attachment to a fluid container, and means carried on said cap, and defining a system of through passages for fluid under pressure, said means having an entrance bore, on the upstream side, a first reduced bore beyond said entrance bore, defining a first shoulder, a second reduced bore beyond said first reduced bore, defining a second shoulder, said second, reduced bore having at least one lateral port communicating with the atmosphere, an exit bore on the downstream side, and an intermediate passage arranged transversely to said exit bore and the other said bores, said passage comprising an inner bore, an intermediate counterbore, and a threaded, outer counterbore, a valve stem threadedly received in said outer counterbore, and having a tapered, inner end seatable on the rim of said inner bore, a port communicating between said second, reduced bore and said intermediate counterbore, a port communicating between said inner bore and said exit bore, and substantially less in diameter than said exit bore, said cap having an aperture venting to atmosphere, said cap and said means having a common passage, adapted to hold a tube for immersion in a said fluid container, and said means having a restricted passage communicating between said common passage and said exit bore, and a check valve of rubbery material, comprising a disc-form base seated on said second shoulder, and having an extending, peripheral flange seated on said first shoulder, said disc having a skirt forming a cylindrical cup on its downstream side, loosely fitted in said second reduced bore and adapted to close said lateral port under internal pressure, and yield to external pressure to uncover said lateral port, said disc having a central, through opening, of elongate, elliptical form, and said disc having a second skirt on its downstream side, forming a continuation of said opening, and having a terminal portion with side walls converging to a line of contact, forming a slit generally comparable in length with the major axis of said opening.

6. A spray head comprising a unitary, main body having a cylindrical cup element adapted for attachment to a fluid container, and means carried on said cap, and defining a system of through passages for fluid under pressure, said means having an entrance bore, on the upstream side, a reduced bore beyond said entrance bore, defining a shoulder, said reduced bore having at least one lateral port communicating with the atmosphere, an exit bore on the downstream side, and an intermediate passage arranged transversely to said exit bore and the said reduced bore, said passage comprising an inner bore, an intermediate counterbore, and a threaded, outer counterbore, a valve stem threadedly received in said outer counterbore, and having a tapered, inner end seatable on the rim of said inner bore, a port communicating between said reduced bore and said intermediate counterbore, a port communicating between said inner bore and said exit bore, and substantially less in diameter than said exit bore, said cap having an aperture venting to atmosphere, said cap and said means having a common passage, adapted to hold a tube for immersion in a said fluid container, and said means having a restricted passage communicating between said common passage and said exit bore, and a check valve of rubbery material, comprising a disc-form base seated on said shoulder, said disc having a skirt forming a cylindrical cup on its downstream side, loosely fitted in said reduced bore and adapted to close said lateral port under internal pressure, and yield to external pressure to uncover said lateral port, said disc having a central, through opening, of elongate, elliptical form, and said disc having a second skirt on its downstream side, forming a continuation of said opening, and having a terminal portion with side walls converging to a line of contact, forming a slit generally comparable in length with the major axis of said opening.

7. A spray head comprising a unitary main body having a cylindrical cup element adapted for attachment to a fluid container, and means carried on said cap, and defining a system of through passages for fluid under pressure, said means having an entrance bore, on the upstream side, a reduced bore beyond said entrance bore, defining a shoulder, said reduced bore having at least one lateral port communicating with the atmosphere, an exit bore on the downstream side, and an intermediate passage arranged transversely to said exit bore and the said reduced bore, said passage comprising an inner bore, and a threaded, outer counterbore, a valve stem threadedly received in said outer counterbore, and having a tapered, inner end seatable on the rim of said inner bore, a port communicating between said reduced bore and said outer counterbore, a port communicating between said inner bore and said exit bore, and substantially less in diameter than said exit bore, said cap having an aperture venting to atmosphere, said cap and said means having a common passage, adapted to hold a tube for immersion in a said fluid container, and said means having a restricted passage communicating between said common passage and said exit bore, and a check valve of rubbery material, comprising a disc-form base seated on said shoulder, said disc having a skirt forming a cylindrical cup on its downstream side, loosely fitted in said reduced bore and adapted to close said lateral port under internal pressure, and yield to external pressure to uncover aid lateral port, said disc having a central, through opening, of elongate, elliptical form, and said disc having a second skirt on its downstream side, froming a continuation of said opening, and having a terminal portion with side walls converging to a line of contact, forming a slit generally comparable in length with the major axis of said opening.

8. A spray head comprising a unitary, main body having a cylindrical cup element adapted for attachment to a fluid container, and means carried on said cap, and defining a system of through passages for fluid under pressure, said means having an entrance bore, on the upstream side, a reduced bore beyond said entrance bore, defining a shoulder, said reduced bore having at least one lateral port communicating with the atmosphere, an exit bore on the downstream side, and an intermediate passage arranged transversely to said exit bore and the said reduced bore, said passage comprising an innner bore, and a threaded, outer counterbore, a valve stem threadedly received in said outer counterbore, and having a tapered, inner end seatable on the rim of said inner bore, a port communicating between said reduced bore and said outer counterbore, a port communicating between said inner bore and said exit bore, and substantially less in diameter than said exit bore, said cap having an aperture venting to atmosphere, said cap and said means having a common passage, adapted to hold a tube for immersion in a said fluid container, and said means having a restricted passage communicating between said common passage and said exit bore, and a check valve of rubbery material, comprising a disc-form base seated on said shoulder, said disc having a skirt forming a cylindrical cup on its downstream side, loosely fitted in said reduced bore and adapted to close said lateral port under internal pressure, and yield to external pressure to uncover said lateral port, said disc having a central, through opening, of elongate, elliptical form, and said disc having a second skirt on its downstream side, forming a continuation of said opening, and having a terminal portion with side walls converging to a line of contact, forming a slit.

References Cited by the Examiner

UNITED STATES PATENTS

| 2,558,238 | 6/51 | Collins | 239—461 |
| 2,573,982 | 11/51 | Ofeldt | 239—461 |
| 2,822,819 | 2/58 | Geeraert | 137—525.1 |
| 2,922,437 | 1/60 | Rippingille | 137—525.1 |
| 3,034,731 | 5/62 | Chapin | 239—318 |
| 3,088,679 | 5/63 | Ford | 239—318 |
| 3,090,564 | 5/63 | Gilmour | 239—318 |
| 3,113,725 | 11/63 | Packard | 239—318 |
| 3,128,949 | 4/64 | Kaufman | 239—318 |
| 3,132,806 | 5/64 | McNair et al. | 239—318 |
| 3,140,829 | 7/64 | Rose | 239—318 |

M. HENSON WOOD, Jr., *Primary Examiner.*

EVERETT W. KIRBY, *Examiner.*